United States Patent [19]
Gill et al.

[11] Patent Number: 5,167,971
[45] Date of Patent: Dec. 1, 1992

[54] CHECK VALVE ASSEMBLY FOR INJECTION MOLDING APPARATUS

[76] Inventors: Joseph R. Gill, 3410 Perry Dr., NW., Canton, Ohio 44708; Daniel W. Shetler, 6180 Chesham Dr., NE., North Canton, Ohio 44721

[21] Appl. No.: 737,165

[22] Filed: Jul. 29, 1991

[51] Int. Cl.⁵ .............................................. B29C 45/52
[52] U.S. Cl. .................................... 425/559; 425/563
[58] Field of Search ............... 425/559, 562, 563, 564; 251/368; 137/375, 533.17

[56] References Cited

U.S. PATENT DOCUMENTS

| | | | |
|---|---|---|---|
| 3,209,408 | 10/1965 | Kelly | 366/78 |
| 3,698,694 | 10/1972 | Zeug et al. | 366/78 |
| 3,936,038 | 2/1976 | Olmsted | 366/77 |
| 4,105,147 | 8/1978 | Stubbe | 425/562 |
| 4,106,113 | 8/1978 | Laimer et al. | 366/79 |
| 4,472,058 | 9/1984 | Pirro | 366/78 |
| 4,530,605 | 7/1985 | Eichlseder et al. | 425/564 |
| 4,862,907 | 9/1989 | Ledtje et al. | 137/533.11 |
| 4,909,724 | 3/1990 | Sonoda et al. | 425/562 |
| 4,988,281 | 1/1991 | Heathe et al. | 425/559 |

Primary Examiner—Tim Heitbrink
Attorney, Agent, or Firm—Paul E. Milliken; Lee A. Germain

[57] ABSTRACT

This invention provides an improved injection molding apparatus which includes a check valve assembly mounted at the forward end of a feedscrew, the valve assembly being characterized by forward and rearward valve seat surfaces which co-act in a first position to allow a plasticized polymeric material to enter and flow through the valve into an injection chamber and which co-act in a second position to stop any additional material from entering the valve assembly. The second valve position is effected by a feedscrew injection stroke which generates a backpressure to close the valve, the backpressure moving a check ring of the valve assembly into a position to block entry into the valve. The valve seat surfaces are coated with a bonded metal, metal alloy, or ceramic material which effectively increases the abrasion resistance of the valve seat surfaces and thus also increases the wear service life of the check valve assembly. Other wear surfaces of the valve assembly may also be coated for abrasion resistance.

23 Claims, 2 Drawing Sheets

CHECK VALVE ASSEMBLY FOR INJECTION MOLDING APPARATUS

FIELD OF THE INVENTION

This invention relates generally to the art of injection molding apparatus and, more particularly, to an improvement in injection apparatus check valve assemblies as these may be applied to restrict backflow of a plasticized polymeric material during an injection stroke of the apparatus.

BACKGROUND OF THE INVENTION

Injection molding of plasticized polymeric materials including plastic and/or elastomeric type materials has been known and practiced for a long time. These type of apparatus are conventionally associated with various molding machines which are adapted for receiving the plasticized polymer and forming it into many useful parts and/or products.

Injection molding apparatus of the type alluded to are generally comprised of a feedscrew or auger member rotatably carried within a substantially cylindrical barrel, the screw effectively moving and plasticizing the polymeric material throughout the length of the barrel towards an exit end where it is forcefully injected into a molding machine for forming and curing of the material into the desired end product. At an exit end of the feedscrew there is conventionally mounted a check valve assembly which is designed to meter out the proper amount of plasticized material by a pressure reactive motion of the valve to effectively shut off the supply of material and to thereafter force the desired volume of plasticized polymer out of an exit nozzle and into the mold cavity of the molding machine.

Many improvements in this art have been suggested and applied to the injection molding apparatus and these, to an improved configuration of the feedscrew member and/or to the check valve assembly to gain greater effeciency in the injection operation by shortening the injection cycle period. Obviously, a shorter cycle period of the injection molding apparatus will also result in an increase in the number of parts which may be produced inasmuch as the molding machines associated therewith may also be configured to accept and form more individual parts.

These improvements in the injection molding apparatus have fairly coincided with advances in the polymer science and technology which has provided improved material chemistry. The improvements, however, have not been without problems as there is now a noticable increase in wear of the various member elements which comprise the injection molding apparatus. For example, it has been determined that no natural lubricants are available in many of the polymeric materials and this lack of lubrication increases the friction and therefore also the heat generated in plasticizing and injecting the material. Furthermore, it is not possible to add a lubricating material to the process as these tend to contaminate the polymer and this affects the quality of the finished molded product.

In view of the above, friction wear of critical working elements of the injection molding apparatus is a major and continuing problem in the industry as these must be replaced at regular and, in some instances, very short intervals. It is, of course, generally well-known and recognized by those knowledgeable in this art that the various working elements of the injection molding apparatus are comprised of very expensive tool and/or alloy steels, and this, because of the exceptional wear that these elements experience in this type of process. Thus, the very short service lifetimes of these elements will naturally also effect an increase in the cost of the molded parts being produced.

The following prior art patents fairly represent what has been done in attempts to improve the injection molding apparatus: U.S. Pat. Nos. 3,698,694; 4,106,113; 4,105,147; 4,472,058; and 4,988,281. Further U.S. Pat. No. 3,209,408 addresses the friction wear problem by providing a ball-bearing configured check valve assembly. Such type ball-bearing configurations are also evident in some of the above-listed prior art patents. In addition, U.S. Pat. No. 4,530,605 attempts to alleviate part of this problem by providing a rapid takedown configuration for a check valve assembly such that when worn parts need to be replaced this may be done quickly and effeciently with the least amount of downtime. From this it should be apparent that the friction wear problem of critical elements of an injection molding apparatus still exists and this, irrespective of the various advances in the art.

It is, therefore, in accordance with a primary aspect of the present invention an object to provide an improved check valve assembly for an injection molding apparatus wherein the service lifetimes of the various working elements is increased such that many more molded products may be produced before it becomes necessary to replace the working elements of the apparatus.

In accordance with another aspect of the invention it is an object to provide an improved injection molding apparatus check valve assembly which may be made from less expensive base metal and/or tool steel than now applied for these type elements while also providing an operational service life which is greatly extended over what is available with presently made check valve assemblies.

SUMMARY OF THE INVENTION

The above-mentioned objects and other objects and advantages of the present invention are accomplished in an improved check valve assembly for an injection molding apparatus having a rotatable and axially translatable feedscrew within a barrel bore and adapted for moving a polymeric material through the valve assembly towards an exit chamber of the apparatus, the check valve assembly characterized by: a valve body member attached to the forward end of the feedscrew and moveable with the feedscrew, said body member having at least one valve seat surface thereon, an axially slidable member mounted on the body member for limited axial movement thereon, said slideable member having; at least one valve seat surface which frictionally engages a corresponding valve seat surface on the body member, and a circumferential surface at its outside diameter which frictionally engages the inner surface of the barrel bore, the improvement comprising a substantially abrasion-resistant coating bonded to at least part of the frictionally engaging surfaces of the apparatus, said bonded coating effectively reducing frictional wear between coacting frictionally engaging surfaces and between the surfaces and the plasticized material as it is moved through the check valve assembly.

BRIEF DESCRIPTION OF THE DRAWINGS

The advantages of the present invention will best be appreciated and understood from a consideration of the following detailed description when taken in conjunction with the accompanying drawings, in the several figures in which like-reference numerals are used to identify like elements and wherein.

DETAILED DESCRIPTION OF THE INVENTION

Figure 1:
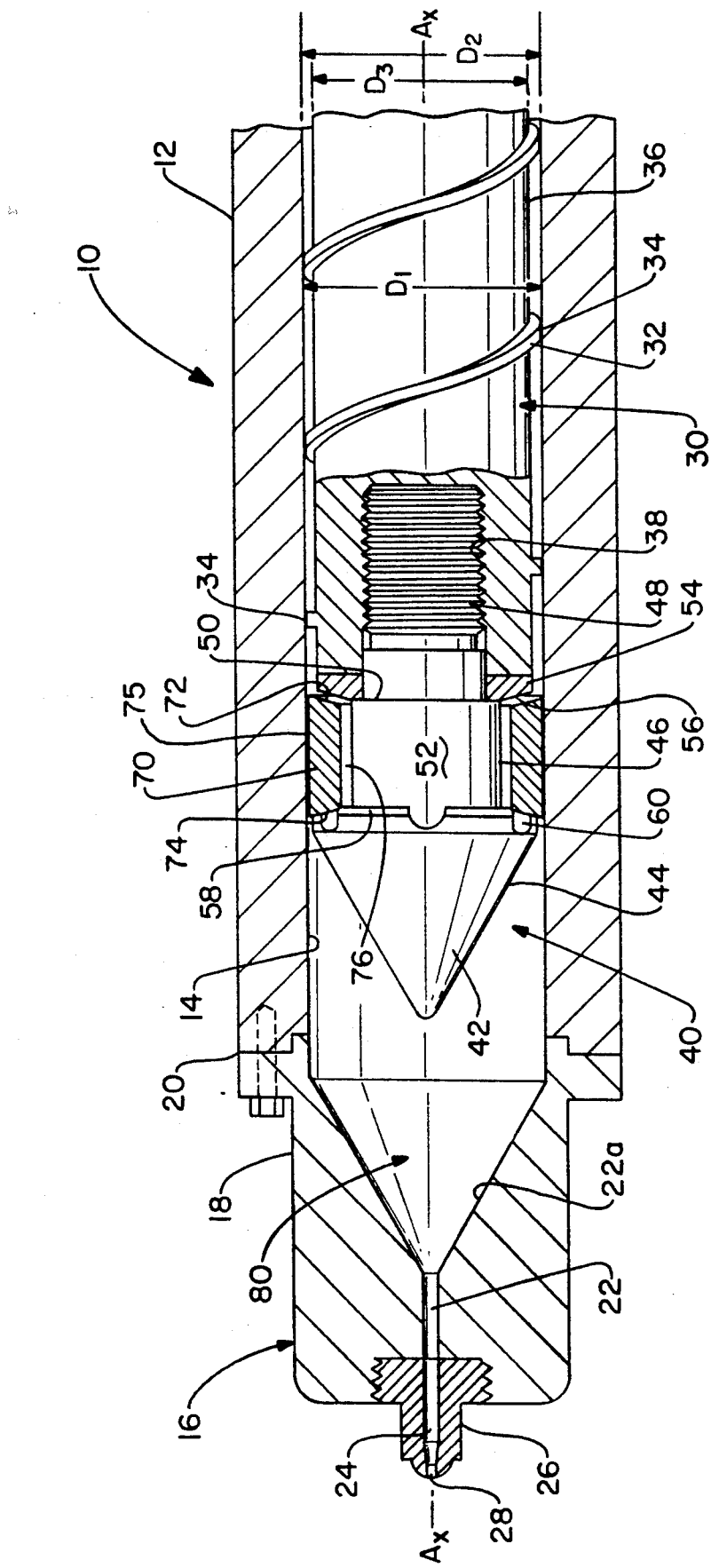
FIG. 1 is a side elevational view, in cross-section and with various parts broken away, illustrating a state-of-the-art injection molding apparatus as may benefit from the concepts taught by the present invention.

In the drawing, FIG. 1 illustrates an injection molding apparatus generally indicated by reference numeral 10. The apparatus 10 conventionally comprises a substantially cylindrical barrel 12 having a specific longitudinal length and it will be recognized that only the exit or output end of the barrel 12 is shown in the drawing. Of course, and as is well-known and understood in this art, an input end (not shown) will include a hopper mechanism for feeding various type of materials into the barrel 12 and the manner of doing this is not an important consideration of the present invention.

The barrel 12 may be characterized by a bore 14 centered on a longitudinal axis as indicated by the line $A_x$—$A_x$ in the drawing. The exit end of the barrel 12 is generally indicated by reference numeral 16 and it may comprise an end cap member 18 which is affixed at 20 to the end of the barrel 12 by any of various well-known methods and/or techniques. The end cap 18 is characterized by a through-bore 22, a partial portion of which is conically shaped as at 22a and it connects into an exit bore 24 of a nozzle tip 26. The nozzle tip 26 is adapted for a mating relationship of the injection molding apparatus 10 to a molding machine (not shown) in the well-known and understood manner of such apparatus.

A feedscrew member 30 is mounted co-axially within the bore 14 of the extruder barrel 12 and it is characterized by a helically oriented thread 32 having a land portion 34 exhibiting an outside diameter $D_1$ which is substantially but not exactly equal to the inside diameter $D_2$ of the bore 14. A slight frictional engagement between the two is evident when the feedscrew 30 is rotated within the barrel bore 14. The feedscrew 30 has a body 36 exhibiting an outside diameter $D_3$ which is less than the outside diameter $D_1$ of the thread 32 by a specific amount and it may be appreciated that a rotation of the feedscrew 30 will effect a movement of any material caught between the outside surface of the feedscrew body 36 and the inside surface of the bore 14 toward the exit end 16 of the apparatus 10.

The feedscrew member 30 has an extruder check valve assembly 40 mounted to its forward end and valves of this type may comprise two or more separate but co-operating parts or elements as evidenced in various of the prior art patents. The particular check valve 40 shown in the drawing comprises a valve body 42 characterized by a conically-shaped tip end 44 and a shank end 46 which has a plurality of threads 48 for a portion of its length. The valve body 42 is affixed to the forward end of the feedscrew 30 by way of the shank end 46 being threadably engaged within a threaded bore 38 at the end of the feedscrew 30. The conically-shaped tip end 44 is shaped to mate with the conically-shaped bore 22a such that any material within the forward portion of the barrel bore 14 will be forceably directed into the exit bores 22 and 24 and out of the exit orifice 28 by an axial movement of the feedscrew 30 into the end cap member 18. It is, of course, well-recognized and understood that the feedscrew 30 is connected to a power source (not shown) which controls its rotational and/or axial motion and the particular power means, therefore, is not important to the scope of the present invention.

The shank end 46 of the valve body 42 has a shoulder 50 formed between the smaller diameter threaded portion 48 and a larger diameter valve passage portion 52, the shoulder 50 providing an axial stop for a valve seat ring 54 carried on the smaller diameter portion 48. The valve seat ring 54 has a forwardly-facing valve seat bearing surface 56 and it is further characterized by an outside diameter which is substantially equal to the diameter $D_3$ of the feedscrew body 36. As clearly evident in the drawing, the valve seat ring 54 is maintained in position between the shoulder 50 and the terminal end of the feedscrew 30 when the valve body 42 is threadably engaged within the bore 38 in the end of the feedscrew.

The valve seat ring 54 comprises the rearward valve seat surface 56 of the check valve assembly 40 while a forward valve seat surface 58 is formed on a backside annular surface of the conically-shaped tip end 44. The forward valve seat 58 has a number of axially oriented flute passages 60 passing therethrough and the purpose of these will become apparent as this description proceeds.

The check valve assembly 40 further comprises a check ring member 70 which is mounted about the shank portion 52 of the shank end 46 and it is movable in the axial direction between the rearward valve seat 56 and the forward valve seat 58. The check ring 70 is further characterized by frustoconical valve seat surfaces 72 and 74, the valve seat surface 72 being in a position to sealingly engage the rearward valve seat 56 of the valve seat ring 54 while the valve seat surface 74 is in a position to sealingly engage the forward valve seat surface 58 on the valve body 42. The valve seat surfaces 56, 58, 72, and 74 are obviously mating surfaces and these may be disposed at an angle within the range of 0°–30° with respect to a radially oriented plane which is positioned orthogonally on the $A_x$ axis.

Further with respect to the check ring member 70, it has an outside diameter surface 75, which is substantially but not exactly equal to the inside diameter $D_2$ of the bore 14. While a sealing type engagement is effected as between the check ring 70 and the bore wall 14 such that material moving through the bore may not pass therebetween, the check ring is movable in the axial direction so as to be alternately engageable with either of the forward valve seat surface 58 or the rearward valve seat surface 56. The check ring 70 also has an inside bore diameter which is larger than the outside diameter of the forward portion 52 of the shank end 46 about which it is mounted. In this configuration, an annular passage indicated at reference numeral 76 is evident and it provides a pass-through for polymeric material when the check valve assembly 40 is in the "valve-opened" position as shown in the drawing.

In the operation of the injection molding apparatus 10 it will be recognized that a material distribution chamber generally indicated by reference numeral 80 may be established between the tip end 44 of the check valve assembly 40 and the conically-shaped bore 22a of the end cap member 18. When the volume of the distribution chamber 80 is established for a particular molded part, the feedscrew 30 is maintained in its axial position within the barrel bore 14 but it is rotated about the $A_x$ axis. This rotation of the feedscrew 30 effectively moves polymeric material being fed into the barrel 12 longitudinally down the bore 14 towards the exit end 16. The movement of material effectively also moves the check ring 70 into axial engagement with the forward valve seat surface 58 as shown in the drawing. Polymeric material is thus able to move through the check valve assembly 40 by way of the open annular passage 76 and the axial flute passages 60 and then into the distribution chamber 80. As the distribution chamber 80 is filled, an injection stroke of the feedscrew 30 causes the check ring 70 to move into axial engagement with the rearward valve seat surface 56 of the valve seat ring 54. Initiation of this powerful injection stroke of the feedscrew 30 in the axially forward direction forces any material within the chamber 80 out of the exit orifice 28 and into a relatively positioned molding chamber (not shown).

From the foregoing description of the injection molding apparatus 10, it must be appreciated that the relative motions as between the various member elements of the apparatus generates heat which also increases the friction component as between the members. This is further aggravated by heat being generated within the polymeric material as it is processed through the apparatus and by a friction component which exists as between the material itself as it passes over the various member element surfaces said. It will, of course, be recognized that the operational service life of the various members will be shortened by the amount of wear of critical surfaces and especially the valve seat surfaces of the check valve assembly 40 which actually govern the operation of the injection molding process.

Figure 2:
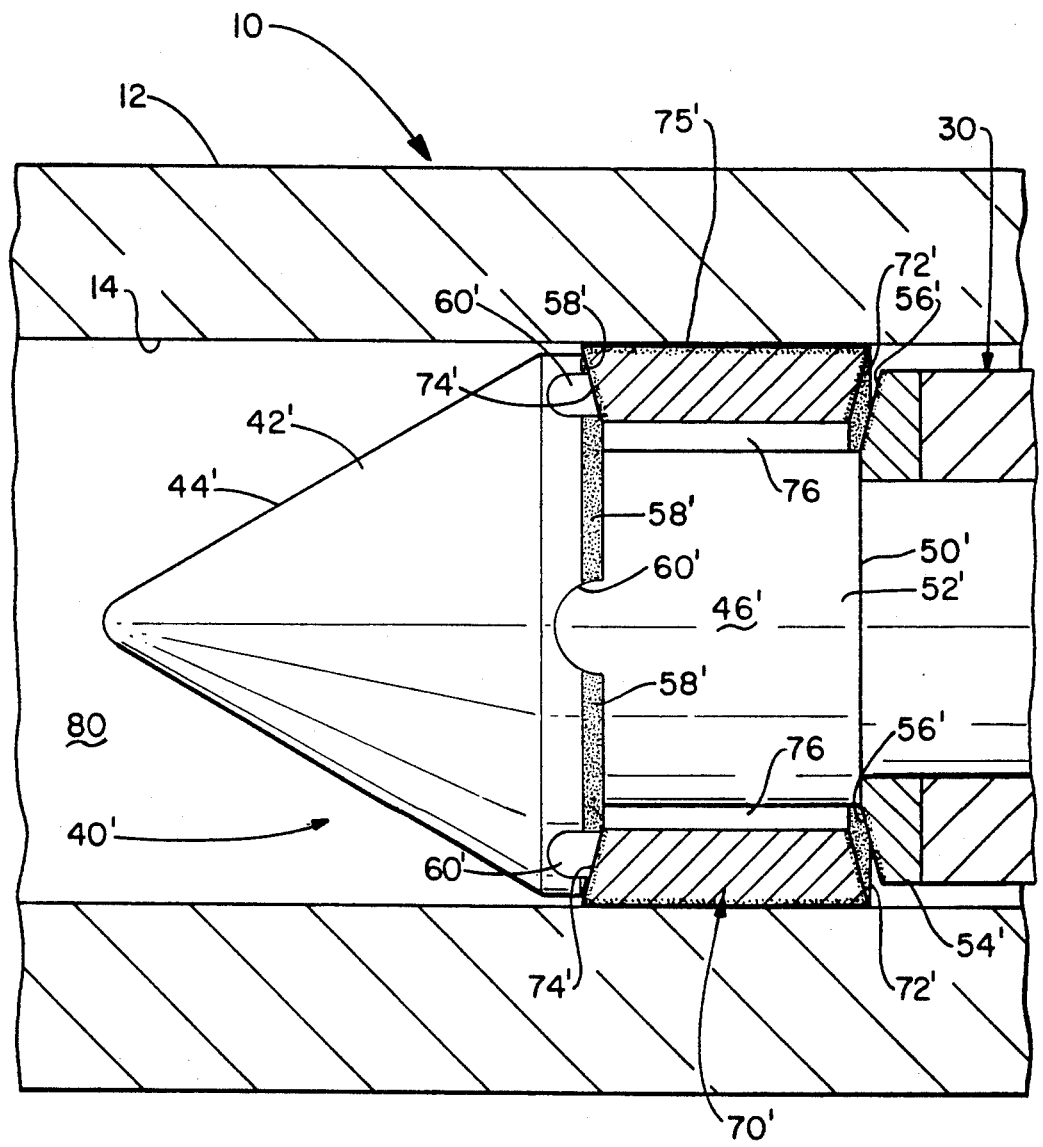
FIG. 2 is a greatly enlarged elevational view, in cross-section, of but a portion of the injection molding apparatus shown in FIG. 1 illustrating the application of the present invention.

Referring now to FIG. 2 of the drawings, a greatly enlarged elevational view of a portion of the apparatus 10 of FIG. 1 is illustrated. In this figure, like-reference numerals are used to designate like elements of FIG. 1 and the primed reference numerals are used to indicate the improved elements of the apparatus in accordance with the concepts of the present invention.

The showing of FIG. 2 is of the forward end of the feedscrew member 30 which carries the check valve assembly 40 in axial position at its forward end. The check valve assembly 40' shown in the figure is an improved design wherein various of the element surfaces which exhibit exceptional wear and which are critical to the operation of the injection molding apparatus are treated with a hard and substantially abrasion-resistant coating which dramatically increases the operational service life of the check valve assembly 40'.

The bonded coating material is shown in the drawing by the stippled areas and, very clearly, these are the valve seat surfaces of (a) the check valve body at 58', (b) the valve seat ring at 56', (c said) the check ring valve seat surfaces 72' and 74', and the check ring outside diameter surface 75'. The bonded coating preferably comprises a metal and/or metal alloy exhibiting a density of at least 8.0 gm/cm$^3$ at 20° C. These may be spray-coated on the desired surfaces by a technique and/or process known in the metallurgical art as High Velocity Oxygen Fuel Coating which is carried out using specific type equipment at over 1927° C.

The bonded coating material is preferably applied to a gauge thickness of not more than 0.030 inch, (0.762 mm) after which the surface is machine-ground to a gauge thickness within the range of 0.005–0.025 inches, (0.127–0.635 mm). Preferably after the grinding operation, the coating material exhibits a gauge thickness of at least 0.006 inch, (0.152 mm). Metal and/or metal alloys of the type alluded to are preferably a mixture of tungsten carbide, cobalt and other elements selected from the group of iron, carbon, nickel and chromium.

In addition to metal and/or metal alloy bonded coatings, it will be recognized that various types of ceramic materials may provide the desired abrasion resistance and these may also be applied in a similar manner to the valve seat and other frictionally engaging wear surfaces. For example, ceramic materials taken from the group comprising the ceramic oxides may be spray-coated by a technique and/or process known in the art as Ceramic Plasma Coating. This invention, therefore, is not limited to a particular metal, metal alloy, and/or ceramic bonded coating but, in the broadest sense covers any high abrasion-resistant material which may be spray-coated in the manner suggested.

Finally, it will also be recognized that when such abrasion resistant material coatings are used the underlying base metal may comprise a less expensive metal and/or metal alloy than presently being used for these parts. For example, the very expensive tool and alloy steels presently being used for the valve seat ring 54 and the check ring 70 may be replaced with a number 4150 steel which costs ninety-five percent less. Obviously, a great savings in materials may be realized by the application of the present invention.

While certain representative embodiments and details have been shown for the purpose of illustrating the invention, it will be apparent to those skilled in this art that various changes and/or modifications may be made therein without departing from the spirit or scope of the invention.

What is claimed is:

1. In an improved check valve assembly for an injection molding apparatus having a rotatably and axially translatable feedscrew within a barrel bore for moving a plasticized polymeric material through the valve assembly towards an exit chamber of the apparatus, the check valve assembly comprising:

(A) a body member having a first forward valve seat surface and a first rearward valve seat surface, and (B) an axially slideable member movable from a valve-opened position, allowing plasticized material to move through the valve, to a valve-closed position prohibiting any material from entering the valve, the slidable member having, (1) a second forward valve seat surface which frictionally engages the first forward valve seat surface, (2) a second rearward valve seat surface of a which sealingly and frictionally engages the first rearward valve seat surface, and (3) an outside diameter surface which sealingly and frictionally engages the inner surface of the barrel bore;

(C) the valve seats and the outside diameter surface constituting frictional wear surfaces;

(D) the improvement comprising a substantially abrasion-resistant coating bonded to at least one of the frictional wear surfaces of the movable member, said bonded coating effectively reducing friction wear between relatively coacting frictional wear surfaces and between the surfaces plasticized material as it is moved through the check valve assembly.

2. The check valve assembly as claimed in claim 1 wherein the bonded coating comprises a metal which exhibits a density of at least 8.0 gm/cm$^3$ at 20° C.

3. The check valve assembly as claimed in claim 1 wherein the bonded coating comprises a mixture of tungsten carbide, cobalt and other elements selected from the group consisting essentially of iron, carbon, nickel and chromium.

4. The check valve assembly as claimed in claim 1 wherein the bonded coating is a ceramic material taken from the group consisting essentially of the ceramic oxides.

5. The check valve assembly as claimed in claim 3 wherein the bonded coating exhibits a gauge thickness of at least 0.005 inch.

6. The check valve assembly as claimed in claim 3 wherein the bonded coating exhibits a gauge thickness of not more than 0.030 inch, upon its application and which is machine-ground to a final gauge thickness of not more than 0.025 inch.

7. The check valve assembly as claimed in claim 6 wherein the bonded coating is machine-ground to a gauge thickness of not more than 0.006 inch.

8. The check valve assembly as claimed in claim 4 wherein the bonded coating exhibits a gauge thickness of at least 0.005 inch.

9. The check valve assembly as claimed in claim 4 wherein the bonded coating exhibits a gauge thickness of not more that 0.030 inch upon its application and is machine-ground to a final gauge thickness of not more than 0.025 inch.

10. The check valve assembly as claimed in claim 9 wherein the bonded coating is machine-ground to a final gauge thickness of not more than 0.006 inch.

11. The check valve assembly as claimed in claim 1 wherein the axially slidable member of the check valve comprises an annular ring having second frustoconical forward and rearward valve seat surfaces which effect a mating engagement with the first forward and rearward valve seat surfaces in the valve-opened and valve closed positions respectively.

12. The check valve assembly as claimed in claim 1 wherein the valve seats of the check valve assembly are treated with the abrasion-resistant coating.

13. The check valve assembly as claimed in claim 1 wherein the outside diameter surface of the axially slidable member is treated with the abrasion-resistant coating.

14. In a improved check valve assembly for an injection molding apparatus having a rotatable and axially translatable feedscrew within a barrel bore and adapted for moving a polymeric material through the valve assembly towards an exit chamber of the apparatus, the check valve assembly comprising:

(A) a valve body member attached to the forward end of the feedscrew and moveable with the feedscrew, said body member having at least one valve seat surface thereon;

(B) an axially slidable member mounted on the body member for limited axial movement thereon, said slidable member having;
  (1) at least one valve seat surface which frictionally engages a corresponding valve seat surface on the body member, and
  (2) a circumferential surface at the outside diameter of said axially slidable member which frictionally engages the inner surface of the barrel bore;

(C) the improvement comprising a substantially abrasion-resistant coating bonded to at least one of the frictionally engaging surfaces of the check valve assembly, said bonded coating effectively reducing frictional wear between coacting frictionally engaging surfaces and between the surfaces and the plasticized material as it is moved through the check valve assembly.

15. The check valve assembly as claimed in claim 14 wherein the bonded coating comprises a mixture of tungsten carbide, cobalt- and other elements selected from the group consisting essentially of iron, carbon, nickel and chromium.

16. The check valve assembly as claimed in claim 14 wherein the bonded coating comprises a ceramic material taken from the group consisting essentially comprising the ceramic oxides.

17. The check valve assembly as claimed in claim 15 wherein the bonded coating exhibits a gauge thickness of not more than 0.030 inch upon its application and which is machine-ground to a final gauge thickness of not more than 0.025 inch.

18. The check valve assembly as claimed in claim 17 wherein the final gauge thickness is not more than 0.006 inch.

19. The check valve assembly as claimed in claim 16 wherein the bonded coating exhibits a gauge thickness of not more than 0.030 inch upon its application and which is machine-ground to a final gauge thickness of not more than 0.025 inch.

20. The check valve assembly as claimed in claim 19 wherein the final gauge thickness is not more than 0.006 inch.

21. The check valve assembly as claimed in claim 14 wherein the valve seats of the check valve assembly are treated with the abrasion-resistant coating.

22. The check valve assembly as claimed in claim 14 wherein the outside diameter surface of the axially slidable member is treated with the abrasion-resistant coating.

23. In an injection molding apparatus having a rotatable and axially translatable feedscrew within a barrel bore and adapted for moving a polymeric material through the barrel from an input end to an exit end and having a check valve assembly mounted forwardly on the feedscrew toward the exit end to govern the amount of a plasticized polymeric material being ejected from the apparatus, an improved check valve assembly comprising in combination:

(A) a valve body having a conically-shaped forward end and a rearward shank end, the forward end having axially oriented flute passages through the valve seat surface and said shank end having a valve passage portion and a threaded end portion for threaded engagement within an axial bore in the end of the feedscrew;

(B) a valve seat ring mounted on the shank end of the valve body at the juncture of the valve passage portion and the threaded portion and having a forwardly facing valve seat surface; and (C) an annular valve check ring mounted coaxially about the valve passage portion of the valve body shank end, said check ring having forward and rearward frustoconical valve seat surfaces for alternate seating engagement with the rearward-facing valve seat surface of the conically shaped forward end of the valve body when the valve is in an opened position and with the forward-facing valve seat surface of the valve seat ring when the valve is in a closed position in response to a back-pressure generated by the plasticized material passing through and forwardly of the check valve assembly;

(D) said valve seat surfaces of the valve body, the valve seat ring, and the valve check ring being treated with an abrasion-resistant bonded coating to effectively reduce friction wear between the relatively engaging valve seat surfaces and between the plasticized material and the valve seat surfaces as the material passes through the check valve assembly.

* * * * *